March 5, 1940.  H. W. JOHNSON  2,192,263
INJECTION MOLDING DEVICE
Filed March 20, 1937
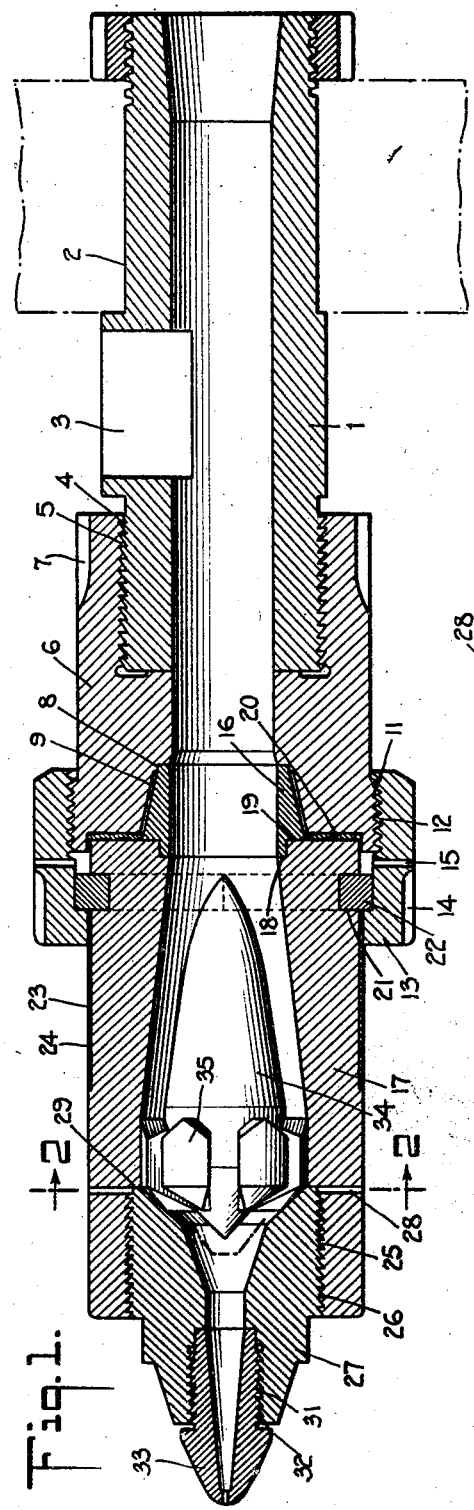
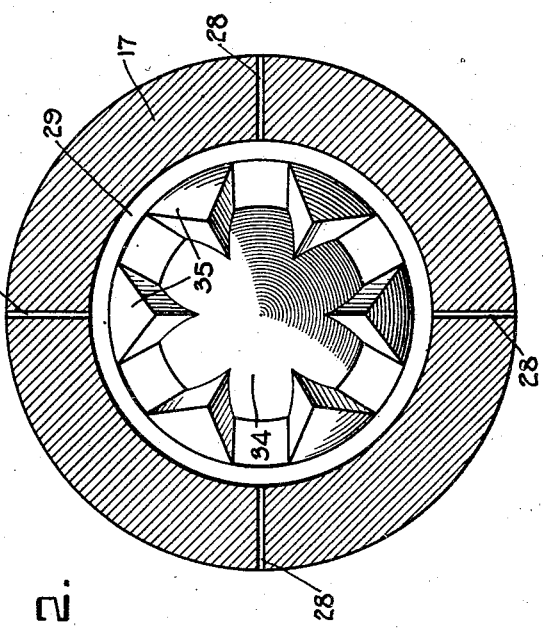
INVENTOR
Herbert Walter Johnson
ATTORNEYS

UNITED STATES PATENT OFFICE 2,192,263

INJECTION MOLDING DEVICE

Herbert Walter Johnson, New York, N. Y., assignor to Celluloid Corporation, a corporation of New Jersey Application March 20, 1937, Serial No. 131,988

2 Claims. (Cl. 18—30)

This invention relates to an injection molding device adapted for die casting thermoplastic derivatives of cellulose and artificial resins. The invention relates especially to the construction of a heating chamber and nozzle assembly for such injection molding devices.

An object of the invention is the economic and expeditious production of a nozzle assembly including a heating chamber for a plastic material extruded under high pressure by an injection molding device, especially of the piston and cylinder type. Another object of the invention is the production of a nozzle and heating chamber which will withstand the pressure of the material within the stress applied by pushing the nozzle against the opening of a mold. Other objects of the invention will appear from the following detailed description and drawing.

In the drawing, wherein like reference numerals refer to the same or similar elements in both views, Figure 1 is a cross-sectional view through a part of an injection molding device and a nozzle and heating chamber assembly, and Figure 2 is a cross-sectional view taken on the line 2—2 in Figure 1.

In die molding articles from thermoplastic artificial materials with devices employing a cylinder and piston-type of injection mechanism, extremely high pressures are employed, often reaching or exceeding 15,000 pounds per square inch. Due in part to the low heat conducting properties of most of the artificial thermoplastic materials, it is necessary to flare out the stream of material to increase its surface contact with the heating elements. This flaring out of the material greatly increases the total pressure in the nozzle due to a greatly increased projected area. This projected area is still further increased upon any movement of the material into the joints between the various portions of the assembly. Furthermore, in die molding with devices employing a cylinder and piston-type of injection mechanism, the nozzle tip is held by pressure against or in a recess of the mold. The force holding the nozzle tip against the mold must be sufficient to prevent spewing of the injected material between the mold and the nozzle tip. This adds an additional stress upon the nozzle and heating chamber. The construction of my nozzle assembly is such that it will withstand these extreme pressures.

In devices as heretofore commonly constructed, many injuries have been occasioned when nozzle assemblies exploded due to the extremely high pressures employed in the extrusion of the thermoplastic materials. Often the high pressures caused fissures to form in the side walls of the conduit thus causing the formation of many defective articles. Attempts were made to reinforce the nozzle assembly by the use of stronger steel and thicker walls. These expedients, however, did not overcome the defects. When the walls were thickened difficulty was encountered in uniformly heating the thermoplastic material and in limiting the heating only to the heating cylinder. Furthermore, the greater weight involved in the use of thicker walls tended to produce looser joints thus permitting leakage of the material into said joints. Leaking at the joints increases the projected area of the material under pressure, thereby causing as great a danger of explosion as was present in the thinner wall assemblies. It will also be appreciated that the space provided for the nozzle assembly limits the extent to which the walls may be thickened. The nozzle assembly constructed in accordance with my invention has thicker walls than those in nozzle assemblies heretofore employed but the design is such that there is no tendency for the pressure to build up to explosive force, i. e. a force which may cause the rupture of the side walls and/or the pulling apart of one section from another.

In accordance with my invention I construct a cylinder, heating chamber and nozzle assembly for an injection molding device that is durable and so designed that it will withstand the pressure and stresses produced in operating the device for extrusion of thermoplastic derivatives of cellulose and resins. Also, in accordance with my invention I construct a nozzle assembly containing "weep" or port holes to reduce the projected area at any opening of the joints and also to give a visible indication of any separation between the various portions of the assembly. By "weep" holes is meant small conduits extending from a joint of two elements to the exterior of the device for the purpose of directing to the surface, with little or no pressure, any plastic material entering the seal between the two elements. The nozzle assembly is also designed with thickened walls, buttress threads and of high yield point steel to withstand the extreme pressures developed therein.

This invention is applicable to the production of articles from press mass powder, grains, chips, flakes, cubes, etc. of thermoplastic material containing a derivative of cellulose such as the organic derivatives of cellulose. The organic derivatives of cellulose may be an organic acid ester of cellulose, a cellulose ether, a mixed ester of cellulose or a mixed ester-ether of cellulose. Examples of organic esters of cellulose are cellulose acetate, cellulose formate, cellulose propionate and cellulose butyrate, while examples of cellulose ethers are methyl cellulose, ethyl cellulose and benzyl cellulose. Examples of mixed esters of cellulose are cellulose nitro-acetate and cellulose acetate-propionate, while examples of mixed ester-ethers of cellulose are benzyl cellulose acetate and methyl cellulose acetate. Mixtures of any of the above derivatives of cellulose may also be employed.

Any suitable thermoplastic material containing artificial resins may also be employed. Examples of such resins are the thermoplastic resins formed by the condensation or polymerization of formaldehyde and urea, phenol and formaldehyde, polyhydric alcohols and polybasic acids, toluene sulphonamide and aldehyde and the condensation or polymerization products of compounds containing the vinyl radical ($CH_2:CH$), for instance, acrylic and methacrylic acid esters, chlorinated derivatives of vinyl compounds and acid derivatives of vinyl compounds such as vinyl acetate, vinyl propionate, etc. or mixtures of these, also styrol and aldehyde reaction products of vinyl compounds known in the trade as Alvar, Formvar, Butalvar, Vinal, etc.

Any of the materials described in U. S. application S. No. 29,466, filed July 2, 1935, and U. S. application S. No. 105,362, filed October 13, 1936, may be employed as the thermoplastic material.

The thermoplastic materials may contain besides the base, such as a derivative of cellulose or a resinous material, suitable effect materials such as plasticizers, pigments, dyes, lakes, fire retardants, fillers, etc. The plasticizers may be the low boiling, medium boiling or high boiling plasticizers or mixtures of these, depending upon the type of article desired, as is well known in the art.

The present invention may be employed upon or in connection with any suitable extrusion or injection molding machine of the cylinder and piston-type, examples of which are the devices shown and described in U. S. application S. No. 12,369, filed March 22, 1935.

In the drawing, wherein one embodiment of my invention is shown, 1 represents the material or pressure cylinder of a cylinder and piston-type of injection molding device. This cylinder may be provided with a suitable bearing 2 for supporting the same in the frame work of the injection molding mechanism. An opening 3 is provided in the cylinder 1, which opening is adapted to receive an end of a hopper, another cylinder or other suitable means, not shown, for feeding the material to the cylinder. The inner diameter of the cylinder 1 is shaped to conform to a piston that is adapted to reciprocate back and forth therein. The pressure cylinder is provided with external buttress threads 4 adapted to receive the internal buttress threads 5 of an adapter section 6. Means 7 may be provided on the adapter section 6, for receiving a wrench or other means of rotating the same. At the end of the adapter section 6 opposite to the internal threaded portion is a recess 8 provided with an annular, conical space or recess 9. At the outside of this end of the adapter section are external threads 11 adapted to receive threads 12 of an adapter nut 13. The adapter nut is provided with means 14 for tightening or turning the same upon the adapter section. Weep holes 15 are provided at spaced intervals in the adapter nut at or near the end of the threaded portion 12.

Adapted to rest in the recess 8 of the adapter section 6 is an adapter bushing 16. This bushing is preferably frusto-conical in shape and is adapted to fit tightly into the recess 8 of the adapter section 6. By means of the recess 9 in the recess 8 and the adapter bushing, a chamber is formed leading from the shoulder of the recess 8 to substantially the end of the adapter section.

A heating chamber 17 is adapted to rest against the adapter bushing 16. The heating chamber is provided with a shoulder 18 registering with a shoulder 19 on the adapter bushing. The adapter bushing is slightly longer than the recess of the adapter section 6. Therefore, between the heating chamber and the adapter section there is provided a gasket 20 made of any suitable material that will withstand the heat and solvents employed such as one of copper and asbestos. The heating chamber 17 is provided with a recess 21 adapted to receive a split ring 22, preferably formed of two half rings. The heating chamber 17, when the device is in operation, is covered with a jacket containing an electric resistance coil or other means for imparting heat thereto. As the heating chamber 17 is cut away at 23 for movement of the adapter nut 13, which adapter nut 13 preferably fits as snugly as possible to the cut away portion 23 of the heating chamber, this cut away portion, after tightening of the adapter nut, is filled with a copper or other metallic band 24. By cutting away the heating chamber 17 as at 23, a thicker adapter nut 13 may be employed so that there will be more material to grip around split ring 22. At the end opposite the shoulder 19 there is formed internal buttress threads 25 adapted to receive the corresponding buttress threads 26 of a nozzle 27. The length of the threaded portions 25 and 26 is preferably not less than 60% of the outside diameter of the nozzle at this point. At or near the inner end of the buttress threads 25 are weep holes 28 in spaced relation about the heating chamber. The weep holes 28 terminate at an internal shoulder 29.

The nozzle 27 is provided with buttress threads 31 adapted to receive corresponding buttress threads 32 of a nozzle tip 33. A "torpedo" or core 34 is formed having beads or fins 35 thereon adapted to fit the inner circumference of the heating chamber to effect the distribution of the material being extruded over a greater area of heating surface. The general shape of the interior conduit of the assembly is a gradual flare to substantially the end of the pressure cylinder through the heating chamber to the nozzle and then a rather sharp contraction of the passage to the orifice of the nozzle tip.

All of the metallic parts of the device, except the split ring, is preferably formed of stainless steel having a yield point of from 120 thousand to 190 thousand pounds per square inch but preferably at least 152 thousand pounds per square inch. A preferred example of this steel is Lesco "L" stainless iron which has been heated to 1850° F. and quenched in oil and then reheated and drawn at temperatures of 600° F. Lesco "L" stainless iron has substantially the following composition: carbon 0.1 maximum, silicon 0.5 maximum, manganese 0.3 to 0.5, chrome 11 to 13 and the rest iron. The walls of the adapter, heating chamber and nozzle are made relatively heavy such that there is no tendency for the walls to expand and form fissures in the inner wall or conduit due to the extreme pressure from within or buck from the stress applied on the nozzle tip. These fissures are formed unless the walls are relatively thick and these fissures tend to hold for a period of time material which would otherwise flow readily on through to the mold. The material held in the fissures tends to decompose and corrode the same. The decomposed and corroded material may pass on into the mold, thus contaminating the article. The corroded material also tends to gradually enlarge the fissure until the assembly explodes at that part. Furthermore, the material held for a period of time in a fissure becomes over-heated and in the molded article forms a brittle spot.

The purpose of the weep holes 28 and 15 is two-fold. As an illustration, reference is particularly drawn to that part of the assembly where the nozzle 27 joins the heating cylinder 17. If the nozzle 27 is the least bit loose, molten material is forced between it and the shoulder 29 and the heating cylinder 17. This greatly enlarges the projected area of the material under pressure. The projected area represents the area of force at the pressure per square inch applied to the material. When employing pressures in the neighborhood of 15,000 to 30,000 pounds per square inch any enlargement of the projected area exerts a greatly increased strain on the threads holding the two elements together. The weep holes 28 permit a release of the pressure on any material entering the joint between the nozzle and the heating cylinder. The weep holes not only release the pressure on spewed material but also direct the material to the surface where it can be seen and give a visual warning of the condition at the joint of the nozzle and heating cylinder, and immediate steps can be taken to correct same. The steps taken to correct the enlargement of the total projected area is to tighten the adapter nut or nozzle so that better contact is obtained at points 8, 18 and 29.

It is to be understood that the foregoing detailed description and drawing are merely given by way of illustration and many alterations may be made therein without departing from the spirit of my invention.

Having described my invention, what I desire to secure by Letters Patent is:

1. A device for molding synthetic thermoplastic material comprising a pressure cylinder, an adapter section mounted on said pressure cylinder, a heating cylinder having a torpedo therein mounted adjacent to said adapter section, a nozzle having a nozzle tip carried by said heating cylinder, a split collar mounted on said heating cylinder, an adapter nut having a shoulder engaging said split collar and an internally threaded portion screwed on to the adapter section, and weep holes between the shoulder and the threaded portion of the adapter nut.

2. A device for molding synthetic thermoplastic material comprising a pressure cylinder, an adapter section mounted on said pressure cylinder, a heating cylinder having a torpedo therein mounted adjacent to said adapter section, a split collar mounted on said heating cylinder, an adapter nut having a shoulder engaging said split collar and an internally threaded portion screwed on to the adapter section, weep holes between the shoulder and the threaded portion of the adapter nut, a shoulder on the inside of said heating cylinder, a nozzle, having a nozzle tip, mounted on said heating cylinder and abutting the shoulder in said heating cylinder and weep holes in said heating cylinder adjacent to the shoulder therein.

HERBERT WALTER JOHNSON.